(12) United States Patent
Lindner

(10) Patent No.: US 9,168,809 B2
(45) Date of Patent: Oct. 27, 2015

(54) AIR CONDITIONING SYSTEM

(75) Inventors: Bjoern Gerd Lindner, Eningen (DE); Barbara Ruhland-Lindner, legal representative, Eningen (DE)

(73) Assignee: MAHLE International GmbH, Stuttgart (DE)

( * ) Notice: Subject to any disclaimer, the term of this patent is extended or adjusted under 35 U.S.C. 154(b) by 772 days.

(21) Appl. No.: 13/447,765

(22) Filed: Apr. 16, 2012

(65) Prior Publication Data

US 2013/0269908 A1  Oct. 17, 2013

(51) Int. Cl.
*B60H 1/00* (2006.01)

(52) U.S. Cl.
CPC .. *B60H 1/00057* (2013.01); *B60H 2001/00092* (2013.01); *B60H 2001/00135* (2013.01)

(58) Field of Classification Search
CPC ............... B60H 1/00057; B60H 2001/00135; B60H 2001/00092
USPC .......... 165/202, 203, 204, 42, 43, 44
See application file for complete search history.

(56) References Cited

U.S. PATENT DOCUMENTS

| | | | | |
|---|---|---|---|---|
| 4,494,597 A | * | 1/1985 | Fukami et al. | 165/41 |
| 4,763,564 A | * | 8/1988 | Czarnecki et al. | 62/244 |
| 4,913,347 A | * | 4/1990 | Burst et al. | 62/244 |
| 4,947,735 A | * | 8/1990 | Guillemin | 454/141 |
| 5,280,852 A | * | 1/1994 | Dauvergne | 454/139 |
| 5,439,415 A | * | 8/1995 | Hirikawa et al. | 454/70 |
| 5,673,747 A | * | 10/1997 | Kousaka et al. | 62/244 |
| 6,872,135 B2 | * | 3/2005 | Currle et al. | 454/139 |
| 2001/0029162 A1 | * | 10/2001 | Yoshinori et al. | 454/137 |
| 2005/0092005 A1 | * | 5/2005 | Wunderlich et al. | 62/244 |
| 2013/0206360 A1 | * | 8/2013 | Zhang et al. | 165/42 |
| 2015/0033782 A1 | * | 2/2015 | Kondo et al. | 62/244 |

FOREIGN PATENT DOCUMENTS

DE    10 2004 003 787 A1    8/2005

* cited by examiner

*Primary Examiner* — Ljiljana Ciric
(74) *Attorney, Agent, or Firm* — Muncy, Geissler, Olds & Lowe, P.C.

(57) ABSTRACT

An air conditioning system is provided, particularly for a vehicle having a main air conditioning unit, an auxiliary air conditioning unit, wherein both the main air conditioning unit and the auxiliary air conditioning unit contain a blower, an evaporator and a heater core, a cold pass is attached to the evaporator, a hot pass is affiliated to the heater core and the cold pass is separated from the hot pass by at least one temperature door. By an air conditioning system, especially for a vehicle, which uses the conditioned air in the vehicle cabin for engine cooling, an additional pass is arranged before the heater core in the auxiliary air conditioning unit wherein said hot pass ends in a body exhauster during the cooling mode of said auxiliary air conditioning unit.

9 Claims, 6 Drawing Sheets

AIR CONDITIONING SYSTEM

BACKGROUND OF THE INVENTION

1. Field of the Invention

The invention refers to an air conditioning system in accordance with preamble of claim 1. The air conditioning system comprises a main air conditioning unit, an auxiliary air conditioning unit, wherein both the main air conditioning unit and the auxiliary air conditioning unit contain a blower, an evaporator and a heater core, a cold pass is attached to the evaporator, a hot pass is affiliated to the heater core and the cold pass is separated from the hot pass by at least one temperature door.

2. Description of the Background Art

The document DE 10 2004 003 787 A1 describes an air conditioning system for a vehicle comprising a blower connected to an evaporator wherein a cold air pass is arranged behind the evaporator. A heat exchanger is positioned before a blower of a combustion engine with a hot pass behind it. The evaporator and the heat exchanger are combined as one part. With help of mixing doors the air passed the heat exchanger and the evaporator are mixed to condition the cabin temperature and cooling the oil of the combustion engine.

Another conventional air conditioning system is shown in FIG. 4-6. The air conditioning system includes two parts, a main air conditioning unit 1 and an auxiliary air conditioning unit 2 arranged in different positions in the vehicle 3. The main air conditioning unit 1 is placed in front of the vehicle 3 while the auxiliary air conditioning unit 2 is arranged in a back side of the vehicle, especially in the vehicle cabin (FIG. 4). The outside air of vehicle is absorbed by the main air conditioning unit 1 and a conditioned air is emitted into the vehicle cabin. The auxiliary air conditioning unit 2 even absorbs air and circulates conditioned air.

In FIG. 5. an auxiliary air conditioning unit 2 is described. The auxiliary air conditioning unit 2 comprises a blower 4, an evaporator 5 and a heater core 6. Behind the evaporator 5 a cold pass 8 extends while a hot pass 9 lies behind the heater core 6. In the cold pass 8 a first temperature door 10 is positioned. Between the evaporator 5 and the heater core 6 a second temperature mixing door 11 is placed. As shown in FIG. 5 the auxiliary air conditioning unit 2 is working in a cooling mode wherein the first temperature door 10 is open and the second temperature mixing door 11 is closed wherefore the air could not flow through the heater core 6. The cold air streams out through an outlet 7.

The hot mode of the auxiliary conditioning unit 2 is shown in FIG. 6. The first temperature door 10 blocked the air in the cold pass 8. The air is deflected and goes through the heater core 6 because the second temperature mixing door 11 is open.

Air that goes through an air conditioning system has to exit the vehicle cabin through one or more body exhausters 12. Especially under warm or hot ambient conditions like in the summertime the heater cores of the main and the auxiliary air conditioning units are not be utilized. The conditioned air from the cabin leaves the vehicle cabin unutilized through the body exhauster.

SUMMARY OF THE INVENTION

The problem addressed in this invention is to indicate an air conditioning system especially for a vehicle, which utilizes the heater core.

In an embodiment, an additional pass is arranged before the heater core in the auxiliary air conditioning unit and said hot pass ends in a body exhauster during the cooling mode of said auxiliary air conditioning unit. By the additional pass air from the vehicle cabin can be absorbed and new conditioned air is used to engine cooling. Especially under warm or hot ambient conditions the need for engine cooling is high demand. The capacity of the heater cores are better used which can reject between 2 and 8 kW under conditions applied in the vehicle cabin. On a truck this can contribute in a range of 0, 5% to 2, 5% of overall heat rejection for engine cooling. For a Mini Van or a Crossover the heater core could cover up to 10% of the heat rejection.

The same advantages can be achieved, if alternatively an additional pass is arranged before the heater core in the main air conditioning unit wherein said hot pass ends in a body exhauster during the cooling mode of said main air conditioning unit.

Furthermore, an additional door is arranged in the additional pass. The additional door allows to guide air to the heater core from the vehicle cabin. Consequently, the capacity of the heater core is better utilized.

In addition, a blend door is arranged behind the heater core limiting said cold pass from said hot pass behind the heater core. With help of the blend door the heater core can be completely isolated from the cold pass.

In another aspect of the invention, an exit door is arranged behind the heater core limiting the hot pass from said body exhauster. The exit door allows the air to flow from the heater core to the body exhauster. Alternatively, the exit door makes it possible for the air to flow directly from the vehicle cabin to the body exhauster.

Moreover, said blend door is arranged near one first end of the long side of the heater core and said exit door near one second end of the long side of the heater core contrary to said cold pass. This embodiment allows optimal using of existing designed space of the air conditioned unit by a high efficiency.

Furthermore, said additional door and/or said exit door are used as a guide wall for heating and temperature control. Hence, the capacity of heater core is also improved in automatic controlled air conditioning systems.

In another aspect of the invention, an additional support blower is added in the main and/or auxiliary air conditioned unit. This has the advantage that conditioned air can draw out from the vehicle cabin through the body exhauster.

In addition, said additional support blower is placed near or in the body exhauster. Because of this arrangement pressure drop of the heater core can be compensated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
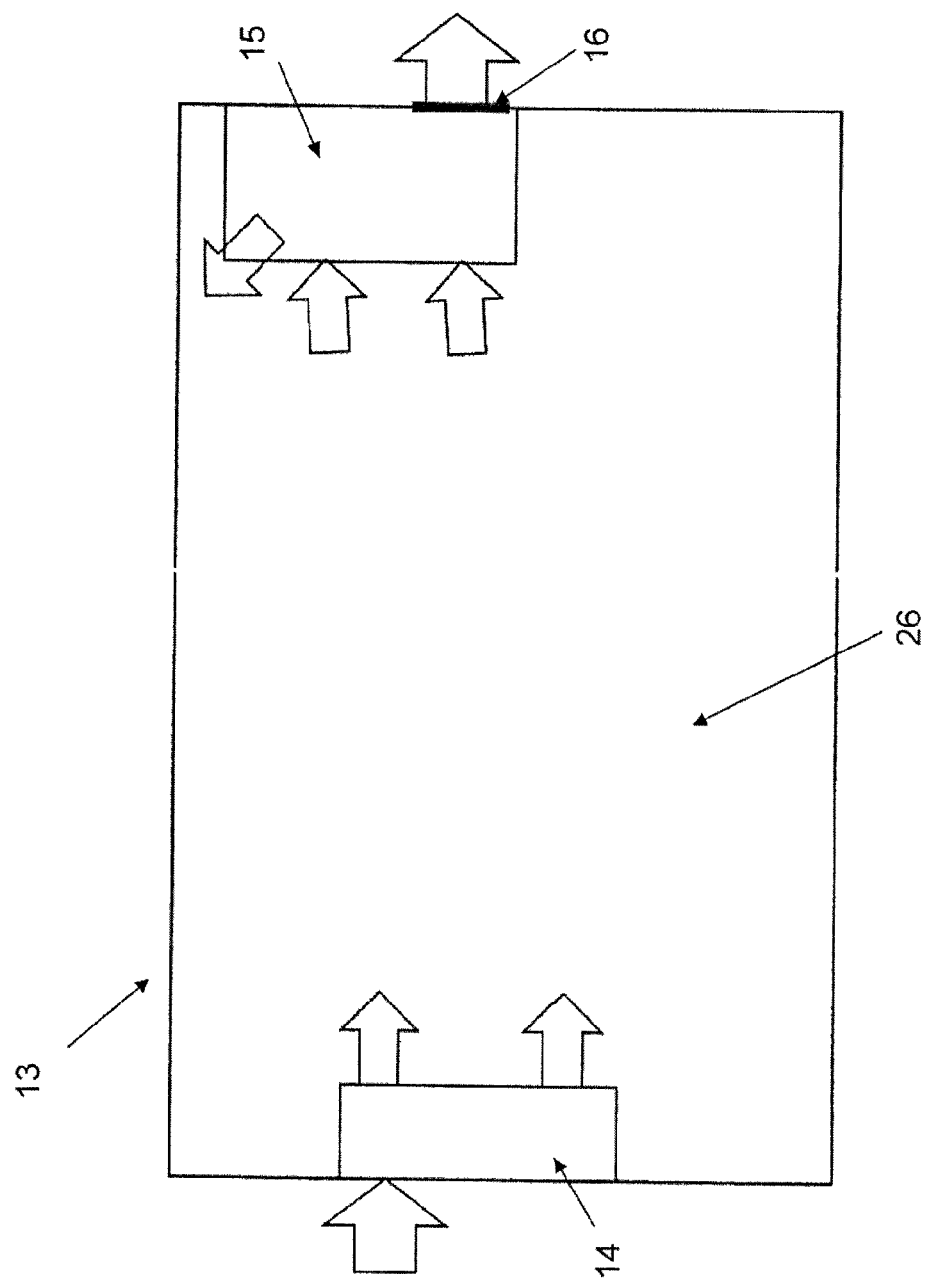
FIG. 1 illustrates a first embodiment of the air conditioning system according of the invention.

FIG. 1 shows a first embodiment of the air conditioning system 13 according the invention. The air conditioning system 13, which could be used in trucks, Mini Vans or Crossovers, comprises two air conditioning units 14 and 15. The main air conditioning unit 14 absorbs outside air and exits conditioned air into the vehicle cabin 26 and is arranged in the front of the vehicle. The auxiliary air conditioning unit 15 is placed in a back room of the vehicle cabin 26, wherein a body exhauster 16 is part of the auxiliary air conditioning unit 15. The auxiliary air conditioning unit 15 absorbs air from the vehicle cabin 26 with help of a blower 17 and emits conditioned air into the vehicle cabin 26. Additionally, the auxiliary air conditioning unit 15 absorbs air from the vehicle cabin over an additional pass, which is positioned in front of the heater core. This air departs the auxiliary conditioning unit 15 and the vehicle cabin 26 over the body exhauster 16.

Figure 2:
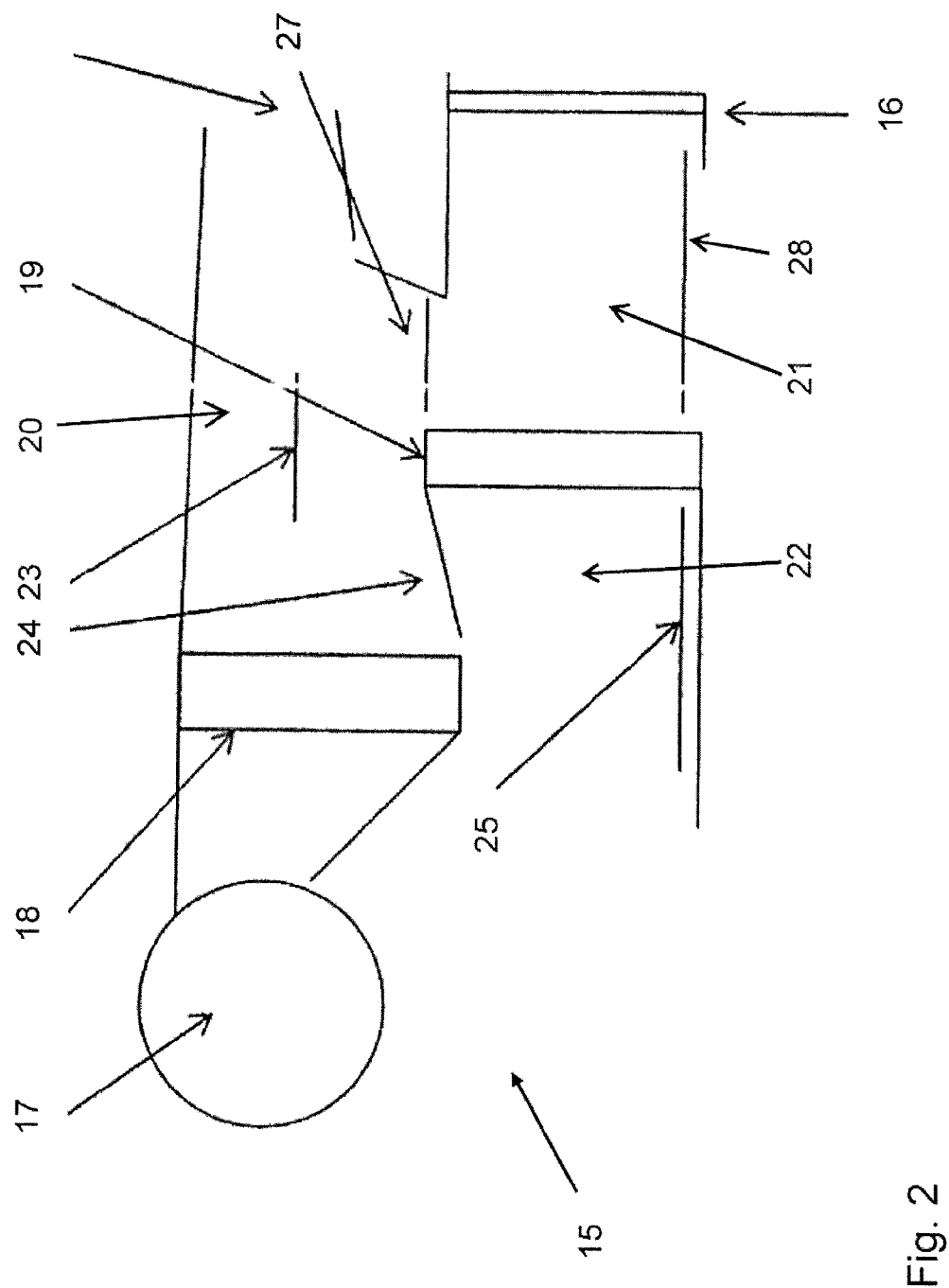
FIG. 2 illustrates an embodiment of auxiliary air conditioning unit according to the invention in a full cooling mode.

FIG. 2 specifies the auxiliary air conditioning unit 15 of FIG. 1. The arrangement of FIG. 2 shows the auxiliary air conditioning unit 15 in a full cooling mode.

A blower 17 absorbs air from the vehicle cabin 26 and leads this air to the evaporator 18, which cools down the temperature of the absorbed air. Behind the evaporator 18 affiliates a cold pass 20 comprising a first temperature door 23. In the cooling mode the temperature door 23 is aligned parallel to the flow direction of the air existing from the evaporator 18.

A second temperature door 24 is arranged between the evaporator 18 and a heater core 19. This second temperature door 24 blocks the cold pass 20 from an additional pass 20 in the cooling mode. The additional pass 20 is designed in front of the heater core 19. An additional door 25 extends on the wall of the additional pass 20 and allows the air of the vehicle cabin 26 to enter in the auxiliary air conditioned unit 15. The air absorbed through the additional pass 20 goes through the heater core 19 in a hot pass 21 extending behind the heater core 19.

The hot pass 21 is lead to the body exhauster 16 and is limited laterally by a blend door 27 and an exit door 28. The blend door 27 and the exit door 28 are arranged on contrary ends of the heater core 19 and lie vis-à-vis. The blend door 27 divides the cold pass 20 from the hot pass 21 whereby in the cooling mode the blend door 27 is closed. Hence, the heater core 19 is completely isolated from the cold pass 20. The exit door 28 is also closed in the cooling mode wherefore only air passing the heater core 19 can enter the hot pass 21. In this embodiment only the air absorbed from the vehicle cabin 26 in the additional pass 22 can flow through the heater core 19 and desert the auxiliary air conditioning unit 15 through the body exhauster 16.

Figure 3:
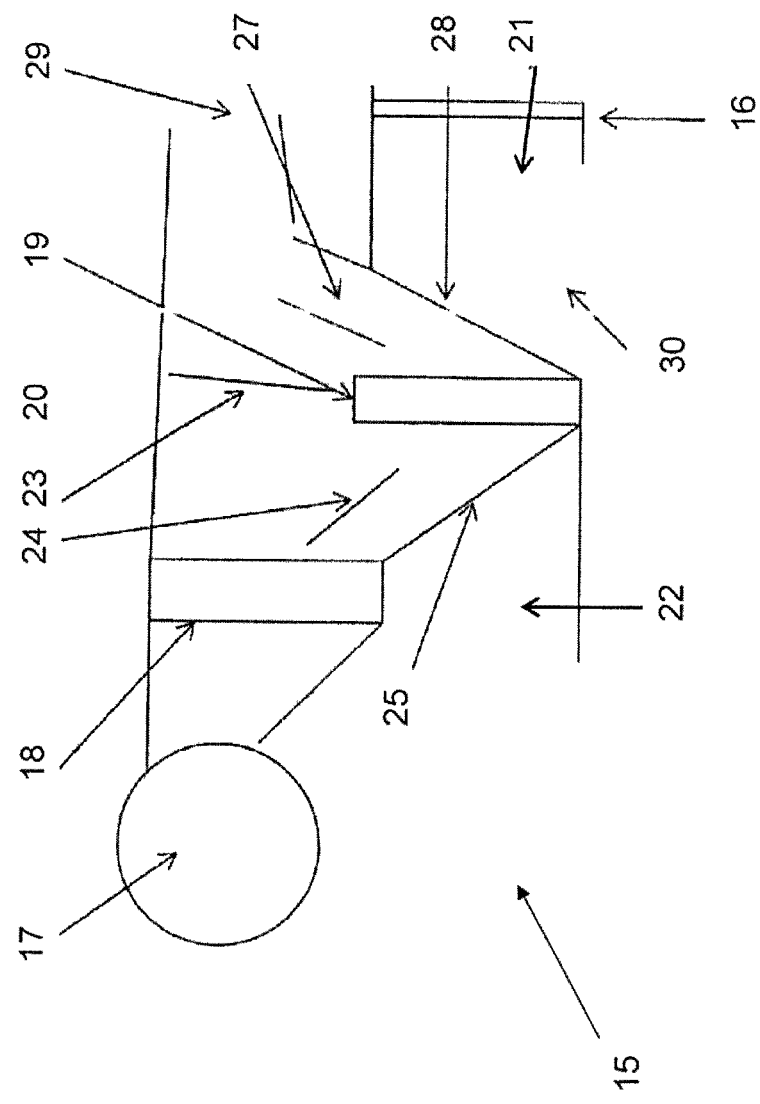
FIG. 3 illustrates an embodiment of auxiliary air conditioning unit according to the invention in a full heating mode.
Figure 4:
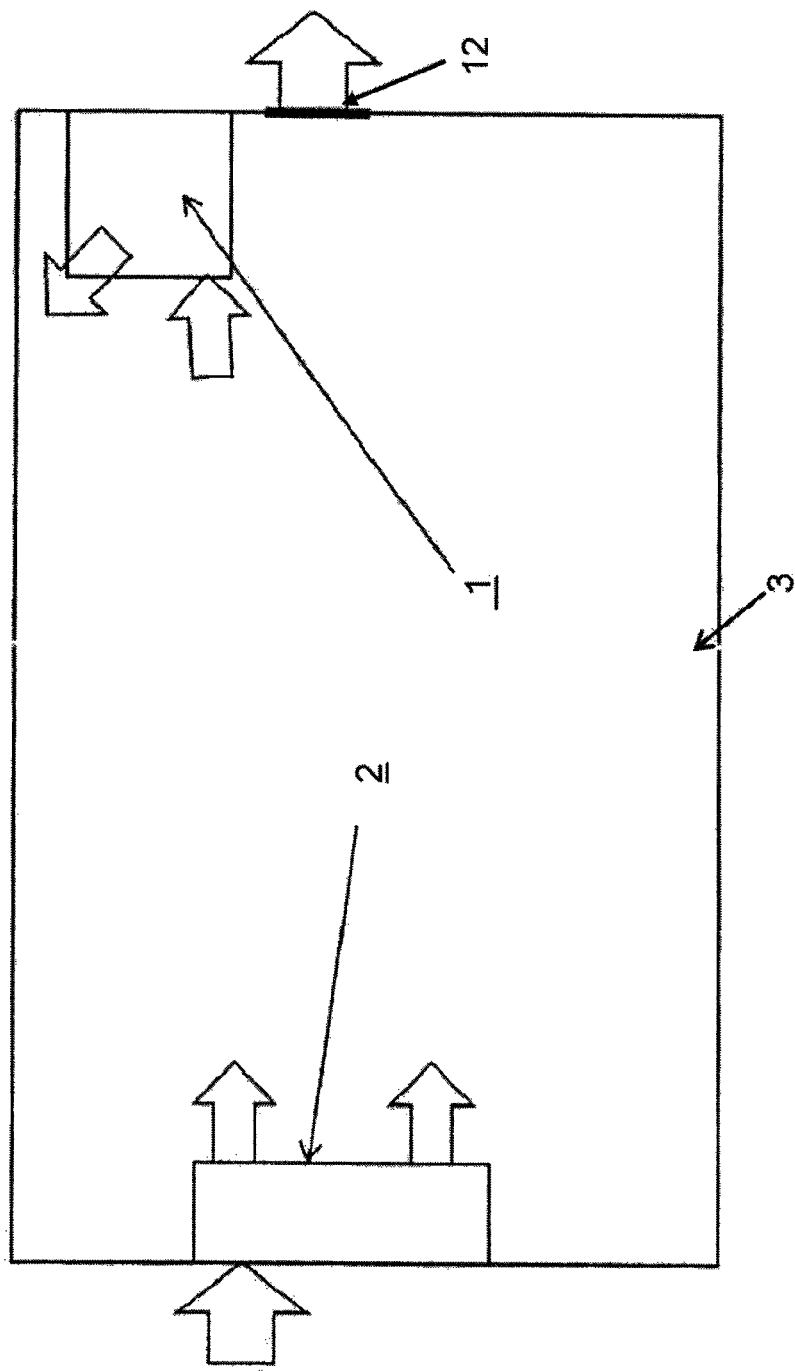
FIG. 4 illustrates an embodiment of an air conditioning system according to the state of the art.
Figure 5:
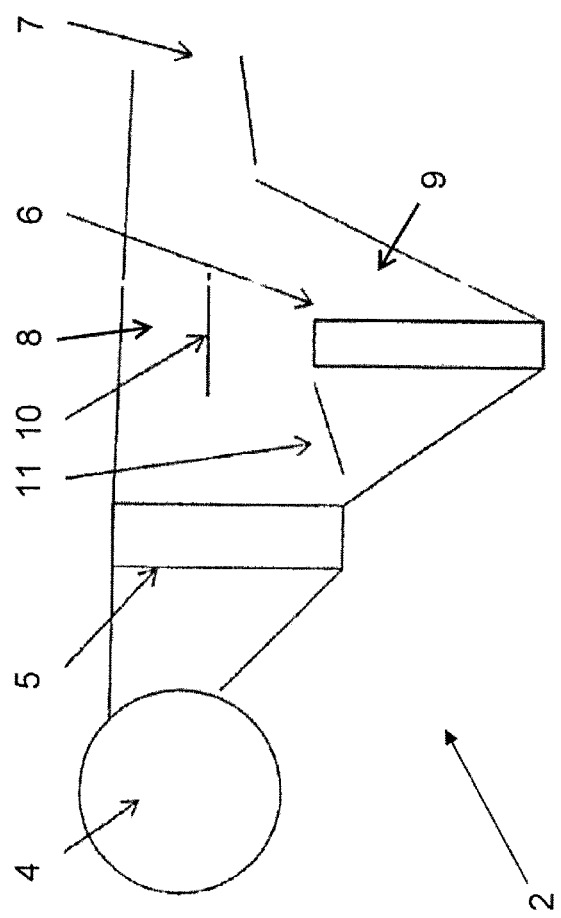
FIG. 5 illustrates an embodiment of auxiliary air conditioning unit according to the state of the art in a full cooling mode.
Figure 6:
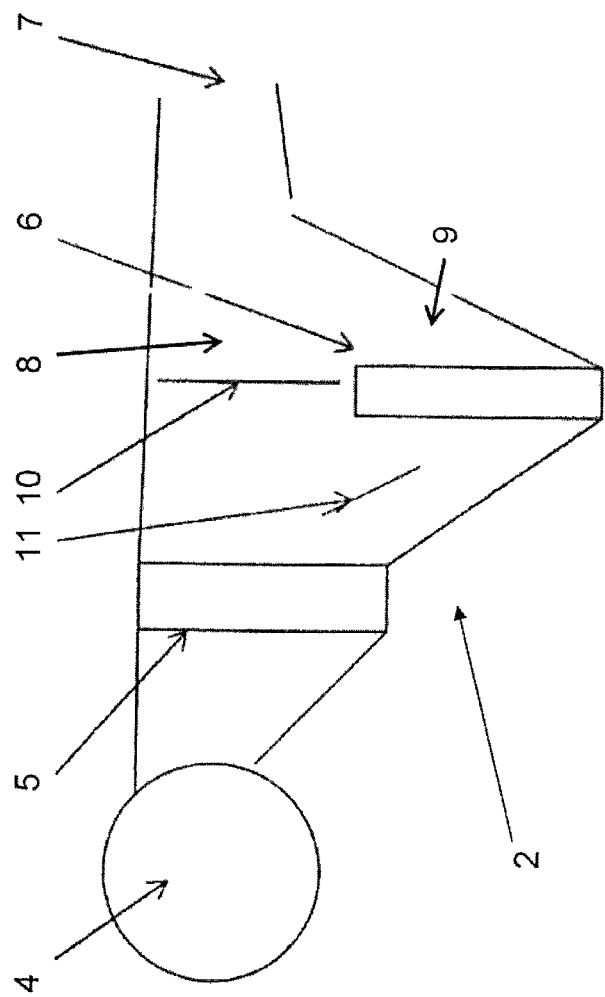
FIG. 6 illustrates an embodiment of auxiliary air conditioning unit according to the state of the art in a full heating mode

The hot mode of the auxiliary air conditioning unit 15 is shown in FIG. 3. The difference to FIG. 2 is in different positions of the two temperature doors 23 and 24, the additional door 25 as well as the exit door 28 and the blend door 27. During the hot mode the first temperature door 23 closes the cold pass 20 wherein the air leaving the evaporator 18 flows in direction to the heater core 19 because the second temperature door 24 is open. While the second temperature door 24 is open the additional door 25 blocks the additional pass 20. Behind the heater core 19 the exit door 28 locks the body exhauster 16. The air coming from the heater core 19 is deflected by the exit door 28 and flows over the open blend door 17 in the direction of the outlet 27. Only the air which flows through the evaporator 18 and the heater core 19 can leave the auxiliary air conditioning unit 15 through an outlet 29. The closed exist door 28 disconnects an aperture 30 for new air from the vehicle cabin 26 which can flow to the body exhauster 16 during the hot mode of auxiliary air condition.

Because of the above mentioned explanations the size, weight and capacity of the auxiliary air conditioning unit can be reduced. Because of the advanced using of the body exhauster engine cooling is supported.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air conditioning system for a vehicle, the system comprising:
    a main air conditioning unit;
    an auxiliary air conditioning unit, the main air conditioning unit and the auxiliary air conditioning unit each comprising a blower, an evaporator and a heater core;
    a cold pass attached to the evaporator;
    a hot pass affiliated to the heater core, the cold pass being separated from the hot pass by at least one temperature door; and
    an additional pass arranged before the heater core in the auxiliary air conditioning unit,
    wherein the hot pass ends in a body exhauster during a cooling mode of the auxiliary air conditioning unit.

2. The air conditioning system according to claim 1, further comprising an additional door arranged in the additional pass.

3. The air conditioning system according to claim 1, further comprising a blend door arranged behind the heater core limiting the cold pass from the hot pass behind the heater core.

4. The air conditioning system according to claim 3, wherein, the blend door is arranged near one first end of a long side of the heater core and the exit door is arranged near one second end of the long side of the heater core contrary to the cold pass.

5. The air conditioning system according to claim 1, further comprising an exit door arranged behind the heater core limiting the hot pass from the body exhauster.

6. The air conditioning system according to claim 1, further comprising an additional door and/or an exit door used as a guide wall for heating and temperature control.

7. The air conditioning system according to claim 6, wherein an additional support blower is placed near or in the body exhauster.

8. The air conditioning system according to claim 1, wherein an additional support blower is added in the main air conditioned unit and/or auxiliary air conditioned unit.

9. An air conditioning system for a vehicle, the system comprising:
    a main air conditioning unit;
    an auxiliary air conditioning unit, the main air conditioning unit and the auxiliary air conditioning unit each comprising a blower, an evaporator and a heater core;
    a cold pass attached to the evaporator;

a hot pass affiliated to the heater core, the cold pass being separated from the hot pass by at least one temperature door; and an additional pass arranged before the heater core in the main air conditioning unit, wherein the hot pass ends in a body exhauster during a cooling mode of the main air conditioning unit.

\* \* \* \* \*